(12) United States Patent
Yang et al.

(10) Patent No.: US 11,300,504 B2
(45) Date of Patent: Apr. 12, 2022

(54) TOMOGRAPHY METHOD, SYSTEM, AND APPARATUS BASED ON TIME-DOMAIN SPECTROSCOPY

(71) Applicant: National Tsing Hua University, Hsinchu (TW)

(72) Inventors: Shang-Hua Yang, Hsinchu (TW); Yi-Chun Hung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 61 days.

(21) Appl. No.: 16/936,420

(22) Filed: Jul. 22, 2020

(65) Prior Publication Data
US 2021/0364426 A1 Nov. 25, 2021

(30) Foreign Application Priority Data

May 21, 2020 (TW) ................. 109116878

(51) Int. Cl.
*G01N 21/3586* (2014.01)
*G06T 11/00* (2006.01)

(52) U.S. Cl.
CPC ........ *G01N 21/3586* (2013.01); *G06T 11/005* (2013.01); *G01N 2201/126* (2013.01)

(58) Field of Classification Search
CPC .......... G01N 21/3586; G01N 2201/126; G06T 11/005
See application file for complete search history.

(56) References Cited

U.S. PATENT DOCUMENTS

| 5,446,799 A | * | 8/1995 | Tuy | ................. G06F 17/153 |
| | | | | 378/4 |
| 7,127,096 B2 | * | 10/2006 | Kaufman | ................. G06T 5/003 |
| | | | | 382/131 |

FOREIGN PATENT DOCUMENTS

| CN | 109978892 | 7/2019 |
| CN | 109978985 | 7/2019 |
| CN | 110390329 | 10/2019 |
| CN | 111000581 | 4/2020 |

(Continued)

OTHER PUBLICATIONS

Jinsong Zhang, et al., "Terahertz Image Detection with the Improved Faster Region-Based Convolutional Neural Network." Sensors(Basel), vol. 18, No. 7, Jul. 18, 2018, pp. 1-19.

Karen Simonyan, et al., "Very Deep Convolutional Networks for Large-scale Image Recognition." ICLR 2015, Apr. 2015, pp. 1-14.

(Continued)

*Primary Examiner* — David P Porta
*Assistant Examiner* — Fani Boosalis
(74) *Attorney, Agent, or Firm* — JCIPRNET

(57) ABSTRACT

A tomography method, system, and apparatus based on time-domain spectroscopy are provided. A light emitter is controlled to emit a pulse beam to scan a cross-section of an object to be measured while using a light receiver to detect the pulse beam passing through the object to be measured, so as to obtain time-domain pulse signals at locations of a scan path. A scan angle is repeatedly changed to perform the scanning and detecting steps, so as to collect the time-domain pulse signals of multiple angles of the cross-section as a time information set. Features are retrieved from the time-domain pulse signals using kernels of a trained machine learning model, which is trained with time information sets and corresponding ground truth images of cross-sections to learn the kernels for retrieving the features. The retrieved features are converted into a spatial domain to reconstruct a cross-sectional image of the object.

15 Claims, 11 Drawing Sheets

(56) References Cited

FOREIGN PATENT DOCUMENTS

| | | |
|---|---|---|
| CN | 111161371 | 5/2020 |
| TW | 201204327 | 2/2012 |
| WO | 2019060843 | 3/2019 |

OTHER PUBLICATIONS

Yi-Chun Hung, et al., "Terahertz Deep Learning Computed Tomography." 2019 44th International Conference on Infrared, Millimeter, and Terahertz Waves, Sep. 1-6, 2019, pp. 1-2.

"Office Action of Taiwan Counterpart Application", dated Mar. 4, 2021, p. 1-p. 3.

* cited by examiner

US 11,300,504 B2

TOMOGRAPHY METHOD, SYSTEM, AND APPARATUS BASED ON TIME-DOMAIN SPECTROSCOPY

CROSS-REFERENCE TO RELATED APPLICATION

This application claims the priority benefit of Taiwan application serial no. 109116878, filed on May 21, 2020. The entirety of the above-mentioned patent application is hereby incorporated by reference herein and made a part of this specification.

BACKGROUND

Technical Field

The disclosure relates to an image processing method and apparatus, and in particular to a tomography method, system, and apparatus based on time-domain spectroscopy.

Description of Related Art

Terahertz computed tomography (THz CT) system based on time-domain spectroscopy (TDS) is regarded as one of the most non-destructive ways to show a hidden object and the texture thereof, which may be applied to industries such as safety monitoring, biomedical imaging, remote sensing, non-destructive imaging and industrial testing.

The quality of spatial and spectral imaging lies in image resolution. For image blur caused by factors such as light diffraction, scattering, and non-parallel beam effects, a variety of imaging reconstruction algorithms, such as algorithm based on time-domain information and algorithm based on frequency-domain information, have recently been developed. The algorithm based on time-domain information calculates the peak time difference and reconstructs an image by analyzing the calculated difference. However, the analysis of the algorithm needs to obtain essential information, such as the complex refractive index of the object, in advance to reconstruct the image and improve the spatial resolution. The algorithm based on frequency-domain information uses frequency information, such as phase or amplitude, to reconstruct an image. However, such type of algorithm may cause issues such as image blur due to the loss of time-domain information, such as peak amplitude.

SUMMARY

The disclosure provides a tomography method, system, and apparatus based on time-domain spectroscopy, which can reconstruct a complete image without prior information of an object and improve data usage efficiency and spatial resolution.

The disclosure provides a tomography method based on time-domain spectroscopy, applicable to a tomography apparatus having a processor. The tomography method includes the following steps. A light emitter is controlled to emit a pulse beam to scan a cross-section of an object to be measured while using the light receiver to detect the pulse beam passing through the object to be measured, so as to obtain time-domain pulse signals at multiple locations of a scan path. A scan angle is repeatedly changed to perform the scanning and detecting steps, so as to collect the time-domain pulse signals of multiple angles of the cross-section as a time information set of the cross-section. Multiple features are retrieved from the time-domain pulse signal of each of the angles using multiple kernels of a trained machine learning model, wherein the machine learning model is trained with time information sets of multiple cross-sections and corresponding ground truth images to learn the kernels for retrieving the features. Retrieved features are converted into a spatial domain to reconstruct a cross-sectional image of the object to be measured.

In an embodiment of the disclosure, the step of retrieving the multiple features from the time-domain pulse signal of each of the angles using the multiple kernels includes the following steps. Following operations are performed for the time-domain pulse signal of each of the angles. The time-domain pulse signal detected at each of the locations of the scan path is sampled to obtain multiple sampling points, and the sampling points at all locations of the scan path are stacked to form a feature array. Multiple computing layers are distinguished to perform a reduction operation on the feature array, wherein the kernels are respectively used to perform at least one convolution operation and a max pooling operation on the feature array in each of the computing layers to reduce the feature array. A reduced feature array is converted into the spatial domain in a final layer of the computing layers. Multiple elements in a converted feature array of each of the angles are stacked as the retrieved features.

In an embodiment of the disclosure, the step of distinguishing the multiple computing layers to perform the reduction operation on the feature array includes the following step. A weighted average is performed on the elements corresponding to each of the locations in the feature array as features at the location to reduce the feature array to a one-dimensional array.

In an embodiment of the disclosure, the tomography method further includes the following step. A size of each of the kernels is determined according to a beam size of the pulse beam and a sampling interval of the sampling points.

In an embodiment of the disclosure, the tomography method further includes the following steps. A three-dimensional model is drawn according to multiple features of the object to be measured. A cross-sectional image of the object to be measured corresponding to each of the angles of the three-dimensional model is retrieved as the corresponding ground truth images of the cross-sections for training the machine learning model.

In an embodiment of the disclosure, after the step of drawing the three-dimensional model according to the multiple features of the object to be measured, the tomography method further includes the following step. The object to be measured is manufactured according to the three-dimensional model using a three-dimensional printing apparatus and provided for the scanning and detecting steps, so as to obtain the time information sets of the cross-sections for training the machine learning model.

In an embodiment of the disclosure, the tomography method further includes the following step. The scanning and detecting steps are performed on multiple objects to be measured of different materials to obtain the time information sets of the cross-sections of each of the objects to be measured for training the machine learning model.

The disclosure provides a tomography system based on time-domain spectroscopy, which includes a light emitter, a light receiver, and a processing apparatus. The light emitter is configured to emit a pulse beam. The light receiver is configured to detect the pulse beam to obtain time-domain pulse signals. The processing apparatus is coupled to the light emitter and the light receiver, and is configured to perform multiple commands to: control the light emitter to emit the pulse beam to scan a cross-section of an object to be measured while using the light receiver to detect the pulse beam passing through the object to be measured, so as to obtain the time-domain pulse signals at multiple locations of a scan path, and repeatedly change a scan angle to perform the scanning and detecting steps, so as to collect the time-domain pulse signals of multiple angles of the cross-section as a time information set of the cross-section; retrieve multiple features from the time-domain pulse signal of each of the angles using multiple kernels of a trained machine learning model, wherein the machine learning model is trained with time information sets of multiple cross-sections and corresponding ground truth images to learn the kernels for retrieving the features; and convert retrieved features into a spatial domain to reconstruct a cross-sectional image of the object to be measured.

In an embodiment of the disclosure, the processing apparatus includes: performing following operations for the time-domain pulse signal of each of the angles: sampling the time-domain pulse signal detected at each of the locations of the scan path to obtain multiple sampling points, and stacking the sampling points at all locations of the scan path to form a feature array; and distinguishing multiple computing layers to perform a reduction operation on the feature array, wherein the kernels are respectively used to perform at least one convolution operation and a max pooling operation on the feature array in each of the computing layers to reduce the feature array, and converting a reduced feature array into the spatial domain in a final layer of the computing layers; and stacking multiple elements in a converted feature array of each of the angles as the retrieved features.

In an embodiment of the disclosure, the processing apparatus includes performing a weighted average on the elements corresponding to each of the locations in the feature array as features at the location to reduce the feature array to a one-dimensional array.

In an embodiment of the disclosure, the processing apparatus further determines a size of each of the kernels according to a beam size of the pulse beam and a sampling interval of the sampling points.

In an embodiment of the disclosure, the processing apparatus further draws a three-dimensional model according to multiple features of the object to be measured; and retrieves a cross-sectional image of the cross-section corresponding to each of the angles of the three-dimensional model as the corresponding ground truth images of the cross-sections for training the machine learning model.

In an embodiment of the disclosure, the processing apparatus further prints the object to be measured according to the three-dimensional model using a three-dimensional printing apparatus to perform the scanning and detecting steps, so as to obtain the time information sets of the cross-sections for training the machine learning model.

In an embodiment of the disclosure, wherein the processing apparatus further performs the scanning and detecting steps on multiple objects to be measured of different materials to obtain the time information sets of the cross-sections of each of the objects to be measured for training the machine learning model.

The disclosure provides a tomography apparatus based on time-domain spectroscopy, which includes a connection apparatus, a storage apparatus, and a processor. The connection apparatus is configured to connect a light emitter and a light receiver. The storage apparatus is configured to store a computer program and measured data. The processor is coupled to the connection apparatus and the storage apparatus, and is configured to load and perform the computer program to: control the light emitter to emit a pulse beam to scan a cross-section of an object to be measured while using the light receiver to detect the pulse beam passing through the object to be measured, so as to obtain time-domain pulse signals at multiple locations of a scan path, and repeatedly change a scan angle to perform the scanning and detecting steps, so as to collect the time-domain pulse signals of multiple angles of the cross-section as a time information set of the cross-section; retrieve multiple features from the time-domain pulse signal of each of the angles using multiple kernels of a trained machine learning model, wherein the machine learning model is trained with time information sets of multiple cross-sections and corresponding ground truth images to learn the kernels for retrieving the features; and convert retrieved features into a spatial domain to reconstruct a cross-sectional image of the object to be measured.

To make the aforementioned and other features of the disclosure more comprehensible, several embodiments accompanied with drawings are described in detail as follows.

DETAILED DESCRIPTION OF DISCLOSED EMBODIMENTS

An embodiment of the disclosure provides a supervised deep learning (DL) computed tomography (CT) algorithm based on time-domain spectroscopy (TDS), which constructs a time information set for transmitting pulse signals by scanning and measuring multiple cross-sections of an object. The information is sent to a machine learning model for training to learn kernels for retrieving signal features. In this way, when tomography is actually performed on an object to be measured, operations may be performed on the obtained time-domain pulse signals using the learned kernels to reconstruct a cross-sectional image of the object.

Figure 1A:
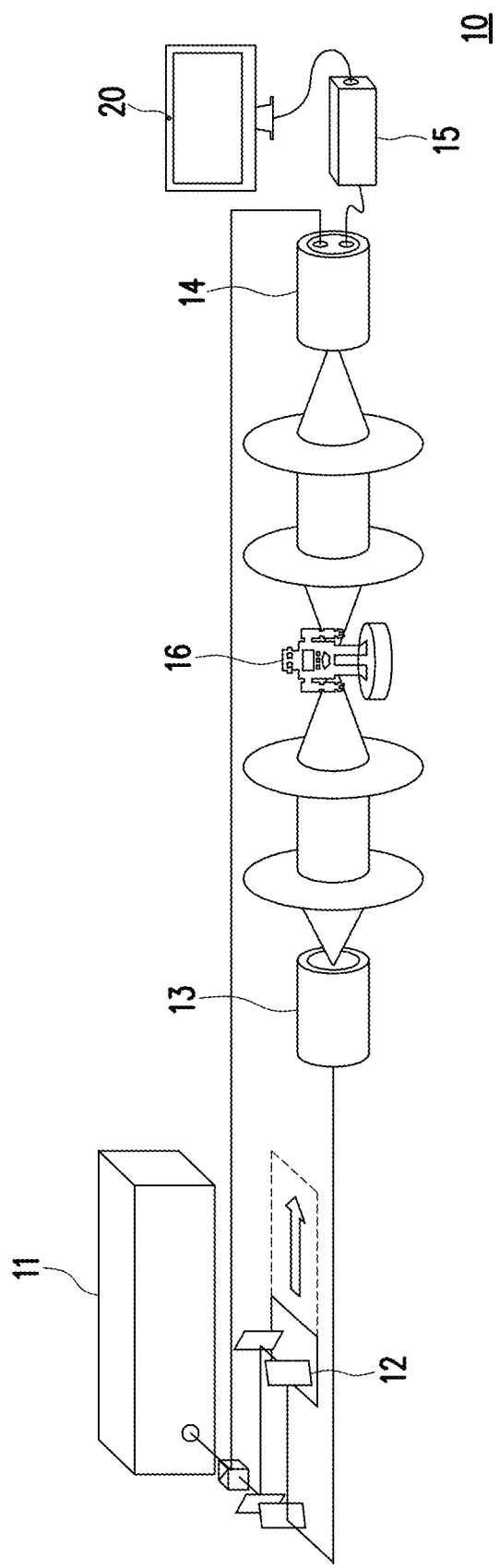
FIG. 1A is a schematic view of a tomography system according to an embodiment of the disclosure.
Figure 1B:
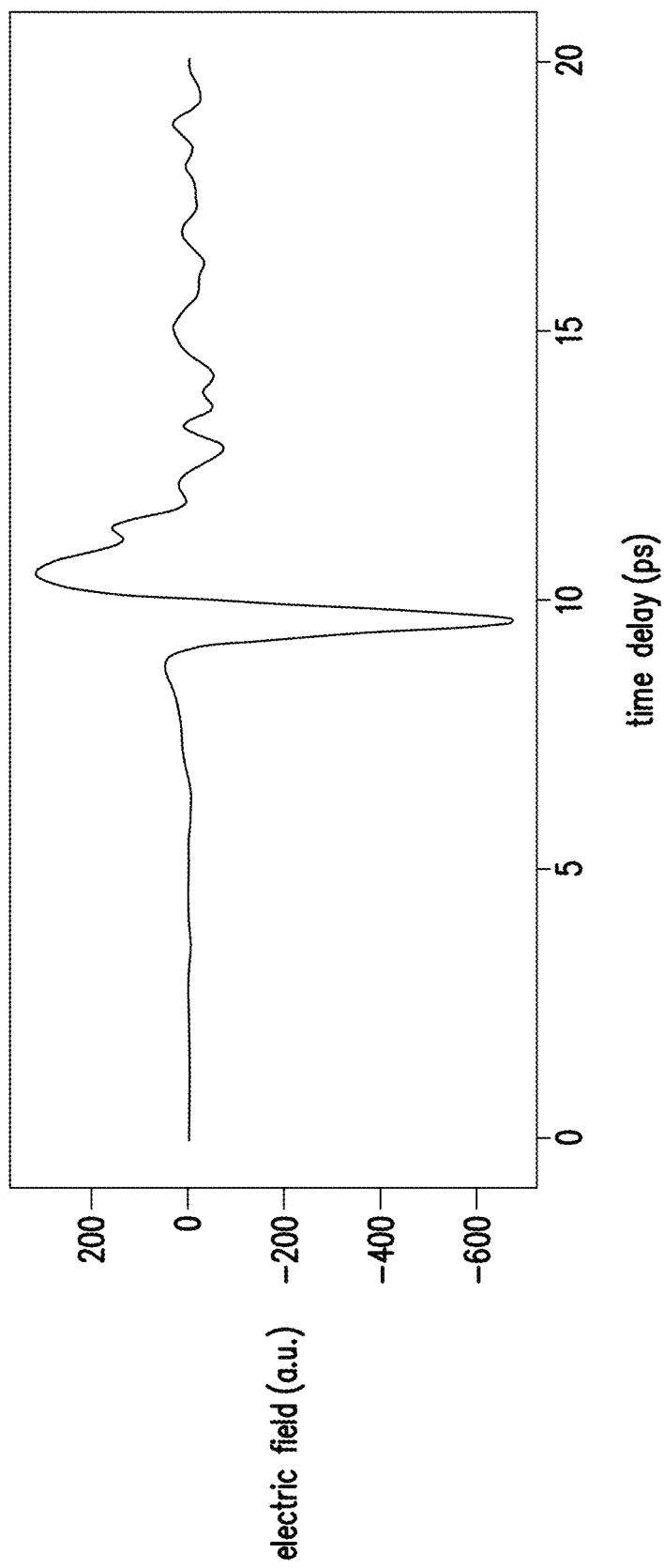
FIG. 1B is a schematic view of a time-domain pulse signal according to an embodiment of the disclosure.

FIG. 1A is a schematic view of a tomography system according to an embodiment of the disclosure. FIG. 1B is a schematic view of a time-domain pulse signal according to an embodiment of the disclosure. Please refer to FIG. 1A first. A tomography system 10 of the embodiment is, for example, a computer tomography system based on time-domain spectroscopy adopting synchronous optical sampling, which uses, for example, terahertz (THz) radiation source, infrared, millimeter wave (mm wave), or other radiation beams capable of penetrating biological, polar, or non-polar materials, interacting with molecules, interacting with electrons, etc. The tomography system 10 is equipped with non-ionized and non-invasive characteristics, and is applicable to applications such as defect testing, in-vivo monitoring, and remote sensing. In the embodiment, the tomography system 10 includes a pulse source 11, a light-splitting system 12, a light emitter 13, a light receiver 14, an amplifier 15, and a processing apparatus (i.e. tomography apparatus) 20. In other embodiments, the tomography system 10 may also be a computer tomography system adopting non-synchronous optical sampling, and the pulse source 11 and the light-splitting system 12 may be integrated into the light emitter 13, which are not limited to the implementation of the embodiment.

In the embodiment, the pulse source 11 is, for example, a femtosecond laser, which may emit a pulse beam with but not limited to a central wavelength of about 1560 nm. In other embodiments, the pulse source 11 may also adopt other types or wavelengths of radiation beams, which is not limited thereto. The pulse beam is respectively sent to the light emitter 13 and the light receiver 14 via the light-splitting system 12, so as to excite a special material in the light emitter 13 to emit a radiation beam. The light emitter 13 is, for example but not limited to, a terahertz photoconductive antenna (PCA), which uses a pulse beam to scan an object to be measured 16. The light receiver 14 is, for example, a terahertz photoconductive antenna corresponding to the light emitter 13, which may detect the pulse beam passing through the object to be measured 16 to obtain a time-domain pulse signal 18 as shown in FIG. 1B.

The amplifier 15 is, for example but not limited to, a trans-impedance amplifier (TIA), which may amplify the time-domain pulse signal 18 detected by the light receiver 14 and send the amplified time-domain pulse signal 18 to the processing apparatus 20 for analysis and monitoring.

Please refer to FIG. 1B. The processing apparatus 20 of the embodiment adopts, for example, a sampling frequency of one million points per second to sample the time-domain pulse signal 18, and analyzes the pulse wave with a width of less than 500 femtoseconds in the time-domain pulse signal 18 to retrieve the features of the time-domain pulse signal 18. The sampling frequency and pulse wave width are only for illustration and may be changed according to different pulse sources, which is not limited by the embodiment.

Figure 2:
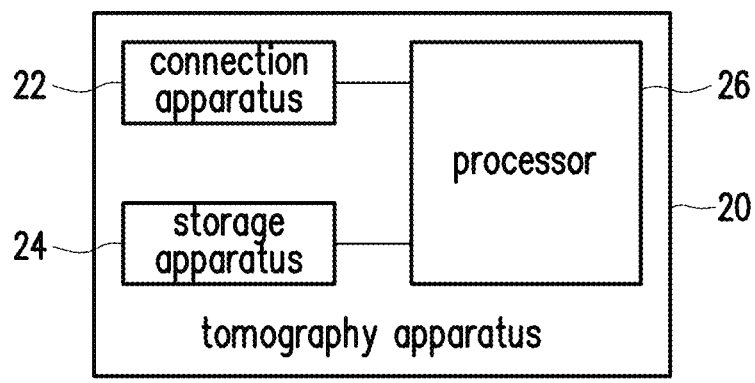
FIG. 2 is a block diagram of a tomography apparatus according to an embodiment of the disclosure.

FIG. 2 is a block diagram of a tomography apparatus according to an embodiment of the disclosure. Please refer to FIG. 1A and FIG. 2 at the same time. The embodiment illustrates the structure of the processing apparatus 20 in FIG. 1A. The processing apparatus 20 is, for example, a computing apparatus such as a computer, workstation, server, etc., which includes elements such as a connection apparatus 22, a storage apparatus 24, and a processor 26. The functions of the elements are described as follows.

The connection apparatus 22 is, for example, any wired or wireless interface apparatus for connecting to the light emitter 13 and the light receiver 14 and transmitting commands or information. A wired connection apparatus may be a universal serial bus (USB), RS232, universal asynchronous receiver/transmitter (UART), inter-integrated circuit ($I^2C$), or serial peripheral interface (SPI), which is not limited thereto. A wireless connection apparatus may be a device supporting communications protocol such as wireless fidelity (Wi-Fi), radio frequency identification (RFID), Bluetooth, infrared, near-field communication (NFC), or device-to-device (D2D), which is not limited thereto.

The storage apparatus 24 is, for example, any type of fixed or removable random-access memory (RAM), read-only memory (ROM), flash memory, hard disk, similar element, or a combination of the above elements, for storing a computer program executable by the processor 26 and the measured data by the amplifier 15.

The processor 26 is, for example, a central processing unit (CPU), other programmable general-purpose or special-purpose microprocessor, microcontroller, digital signal processor (DSP), programmable controller, application specific integrated circuits (ASIC), programmable logic device (PLD), graphics processing unit, other similar devices, or a combination of the devices, which is not limited by the disclosure. In the embodiment, the processor 26 may load the computer program from the storage apparatus 24 to execute the tomography method based on time-domain spectroscopy according to the embodiment of the disclosure.

Figure 3:
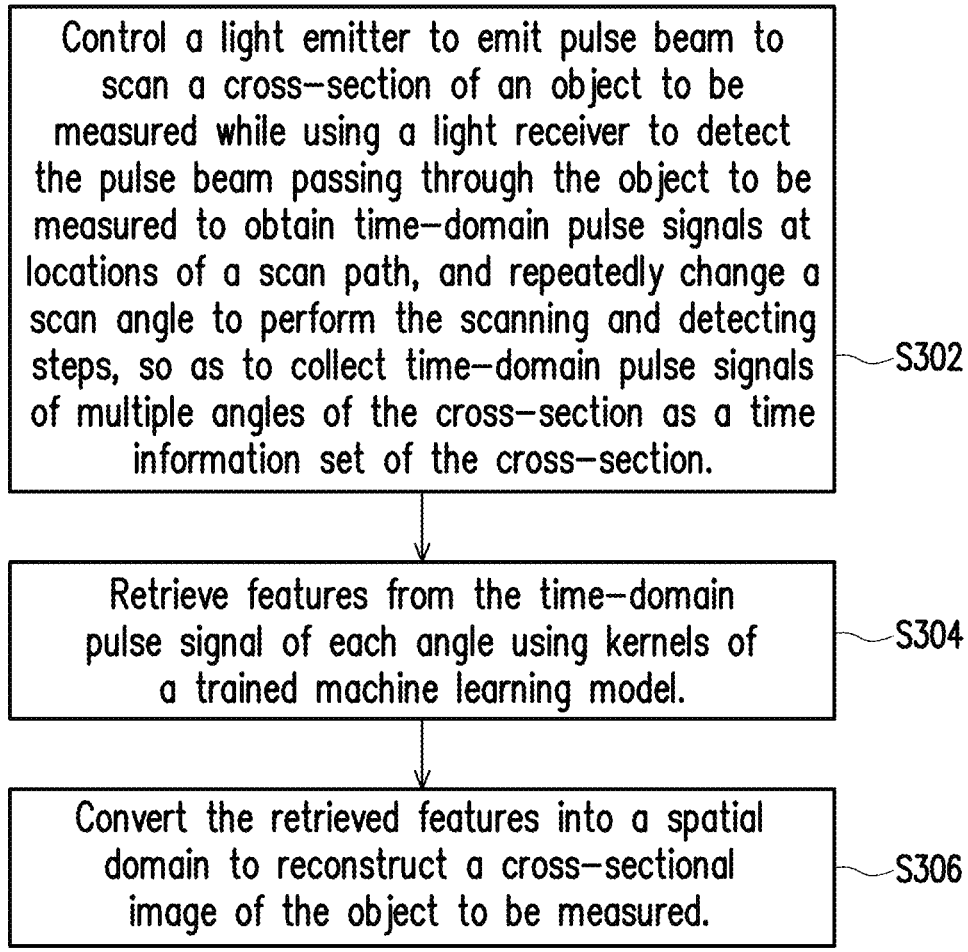
FIG. 3 is a flowchart of a tomography method based on time-domain spectroscopy according to an embodiment of the disclosure.

FIG. 3 is a flowchart of a tomography method based on time-domain spectroscopy according to an embodiment of the disclosure. Please refer to FIG. 1A, FIG. 2, and FIG. 3 at the same time. The method of the embodiment is applicable to the processing apparatus 20. The detailed steps of the tomography method according to the embodiment will be described below with various elements of the processing apparatus 20.

In Step S302, the processor 26 controls the light emitter 13 to emit a pulse beam to scan a cross-section of the object to be measured 16 while using the light receiver 14 to detect the pulse beam passing through the object to be measured 16 to obtain time-domain pulse signals at multiple locations of a scan path. A scan angle is repeatedly changed to perform the scanning and detecting steps, so as to collect the time-domain pulse signals of multiple angles of the cross-section as a time information set of the cross-section.

Figure 4:
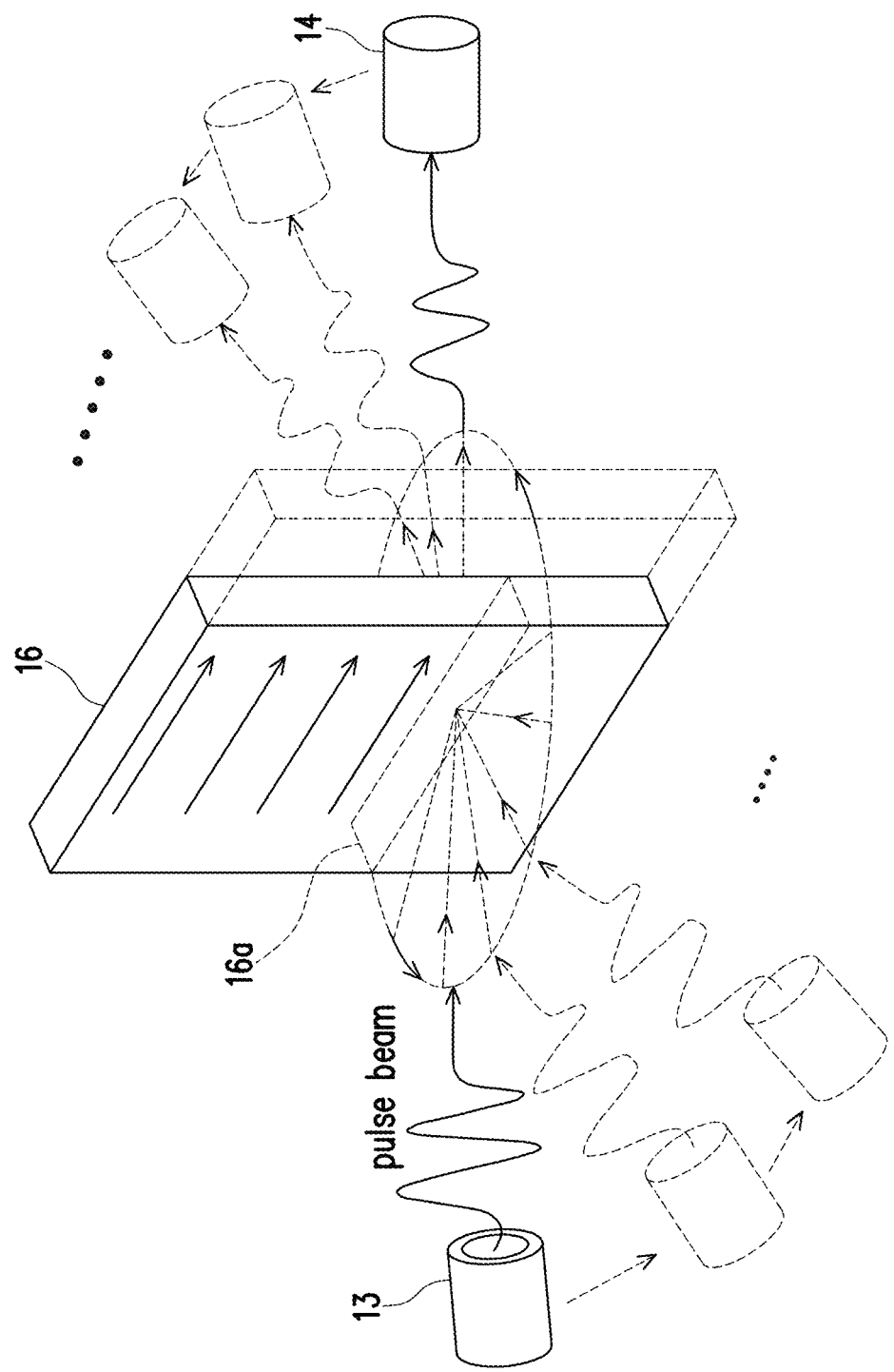
FIG. 4 is a schematic view of a raster scan according to an embodiment of the disclosure.

For example, FIG. 4 is a schematic view of a raster scan according to an embodiment of the disclosure. Please refer to FIG. 1A and FIG. 4 at the same time. In the embodiment, the processing apparatus 20 controls the light emitter 13 to emit a pulse beam to the object to be measured 16 to scan a cross-section 16a of the object to be measured 16, and controls the light receiver 14 disposed on another side of the object to be measured 16 to receive the pulse beam passing through the object to be measured 16.

During the scanning process, the processing apparatus 20 gradually changes the location of the pulse beam projected onto the object to be measured 16 along the scan path by, for example, horizontally moving the light emitter 13 or the object to be measured 16, and controls the light receiver 14 to receive the pulse beam passing through the object to be measured 16 to obtain the time-domain pulse signal at each location of the scan path.

After the scanning of one path is completed, the processing apparatus 20 gradually changes the scan angle of the pulse beam along the cross-section 16a and repeatedly performs the scanning and detecting steps by, for example, rotating the light emitter 13 or the object to be measured 16 on the plane where the cross-section 16a is located. After the cross-section 16a of the object to be measured 16 scanned for some angle ranges (for example, 360 degrees) is rotated by gradually changing the scan angle (for example, by 6 degrees), the processing apparatus 20, for example, collects time-domain pulse signals of multiple angles of the cross-section 16*a* as the time information set of the cross-section 16*a*.

After the scanning of one cross-section is completed, the processing apparatus 20 gradually changes the cross-section of the scanned object to be measured 16 by, for example, vertically moving the light emitter 13 or the object to be measured 16, and repeatedly performs the steps such as scanning, detecting, and rotating. Finally, the time information sets of multiple cross-sections of the object to be measured 16 are obtained.

Returning to the flowchart of FIG. 3, in Step S304, the processor 26 retrieves multiple features from the time-domain pulse signals of various angles using multiple kernels (or filters) of a trained machine learning model. The machine learning model is, for example, a learning model adopting deep learning or other types, which is not limited thereto.

In detail, for the time-domain pulse signal of each angle, the processor 26, for example, samples the time-domain pulse signal detected at each location of the scan path to obtain multiple sampling points, and stacks the sampling points at all locations of the scan path to form a feature array. Then, the processor 26 distinguishes multiple computing layers to perform a reduction operation on the feature array, and converts a reduced feature array into a spatial-domain in a final layer, so as to integrate multiple elements in a converted feature array of each angle as the retrieved features.

In each computing layer, the processor 26, for example, respectively uses the kernels in the machine learning model to perform at least one convolution and max pooling operations on the feature array. For example, two convolution operations are performed on the feature array, and the maximum pooling operation is then performed on the result of the convolution operations, which is not limited thereto.

For the convolution operation, the processor 26 performs the convolution operation on the elements in the kernels and the corresponding elements in the feature array by, for example, using the kernels (array) as a translation window on the feature array, and records the operation result in a result array. Next, the kernels are translated by one element and the convolution operation is then performed again, which is repeated until all elements of the feature array have undergone the convolution operation. In other embodiments, the processor 26 may also translate the kernels by several elements and then perform the convolution operation again, which is not limited to translation by one element. For the maximum pooling operation, the processor 26 may formulate an operation unit (for example, 2×2) to distinguish all elements of the feature array into multiple groups according to the operation unit, and take the maximum value of each group as the operation result to be recorded in the result array. In this way, the size of the feature array may be reduced while retaining feature information.

It should be noted that the machine learning model is, for example, trained with the time information sets of multiple cross-sections and corresponding ground truth images to learn the kernels for retrieving the features. In some embodiments, the number of cross-sections for training the machine learning model is, for example, 940 or any other number, depending on actual requirements. The cross-sections may be multiple cross-sections of the same object or objects of the same material, or multiple cross-sections of objects of different materials, which is not limited thereto. The time information set of each cross-section may be collected in a manner similar to Step S302, which will not be repeated here.

As for the corresponding ground truth image of the cross-section, in some embodiments, the ground truth image is, for example, an image obtained by shooting the cross-section after cutting the cross-section of the actual object. In other embodiments, a three-dimensional model may be drawn according to multiple features of the object to be measured using a computer software, and the cross-sectional images corresponding to the cross-sections of various angles in the three-dimensional model may be retrieved as the corresponding ground truth images of multiple cross-sections for training the machine learning model. The features are, for example, the shape, material, spatial distribution, spectrum features, etc. of the object to be measured, which are not limited thereto.

Figure 5:
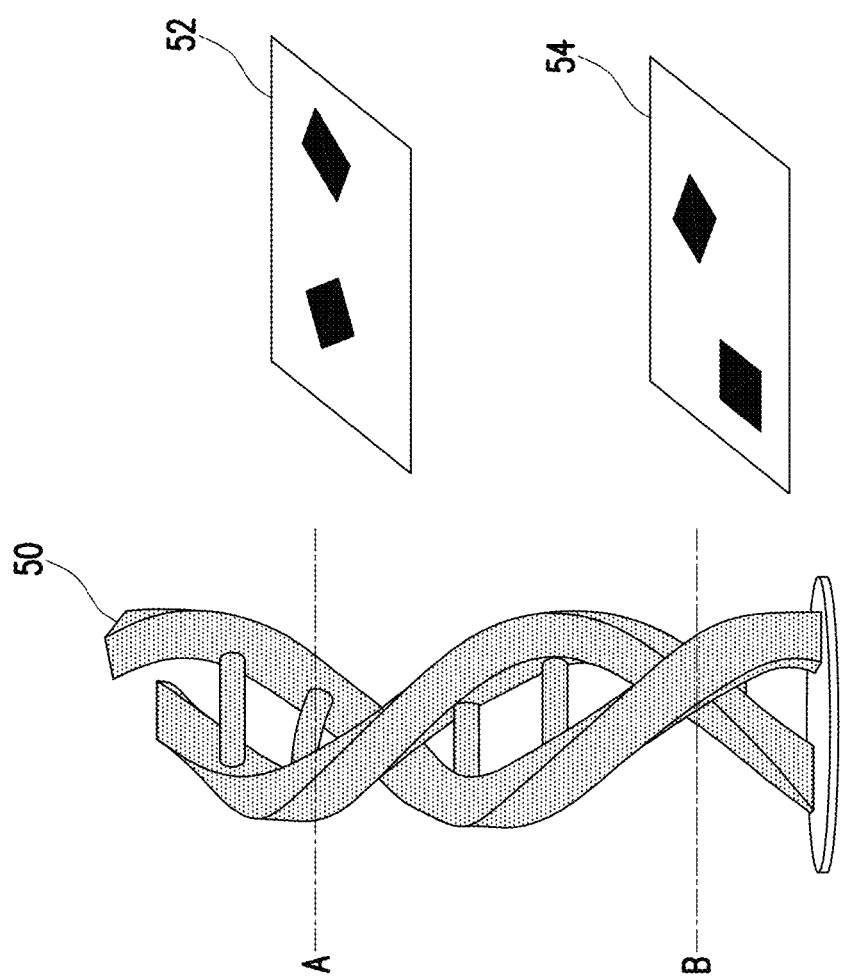
FIG. 5 is an example of a cross-sectional image according to an embodiment of the disclosure.

For example, FIG. 5 is an example of a cross-sectional image according to an embodiment of the disclosure. Please refer to FIG. 5. In the embodiment, an object 50 is, for example, a three-dimensional model drawn using a computer software. By defining the locations and directions of cross-sections A and B, images 52 and 54 of the cross-sections A and B may be retrieved from the three-dimensional model as the ground truth images of the cross-sections for training the machine learning model.

In some embodiments, the processor 26 prints the object to be measured according to the three-dimensional model drawn using, for example, a three-dimensional printing apparatus. The printed object is used for the scanning and detecting steps as described above, so as to obtain the time information sets of multiple cross-sections used for training the machine learning model. In this way, the time information sets for training the machine learning model (obtained by scanning the printed object) and the ground truth images (obtained from the three-dimensional model) may be obtained at the same time without destroying the object. It should be noted that the three-dimensional printing method is only an illustrative example. In other embodiments, the object to be measured may also be made by adopting computer numerical control machine tool, laser processing, injection molding, replica molding, or other ways, which is not limited thereto.

Returning to the flowchart of FIG. 3, in Step S306, the processor 26 converts the retrieved features into the spatial domain to reconstruct the tomographic cross-sectional image of the object to be measured. The processor 26 performs, for example, an inverse radon transform on the retrieved features to convert the features into the spatial domain, so as to reconstruct the cross-sectional image. It should be noted that the method for coverting the features into the spatial domain is only an illustrative example. In other embodiments, linear matrix conversion, non-linear conversion, or other mathematical relations for conversion may also be adopted, which is not limited thereto.

Figure 6:
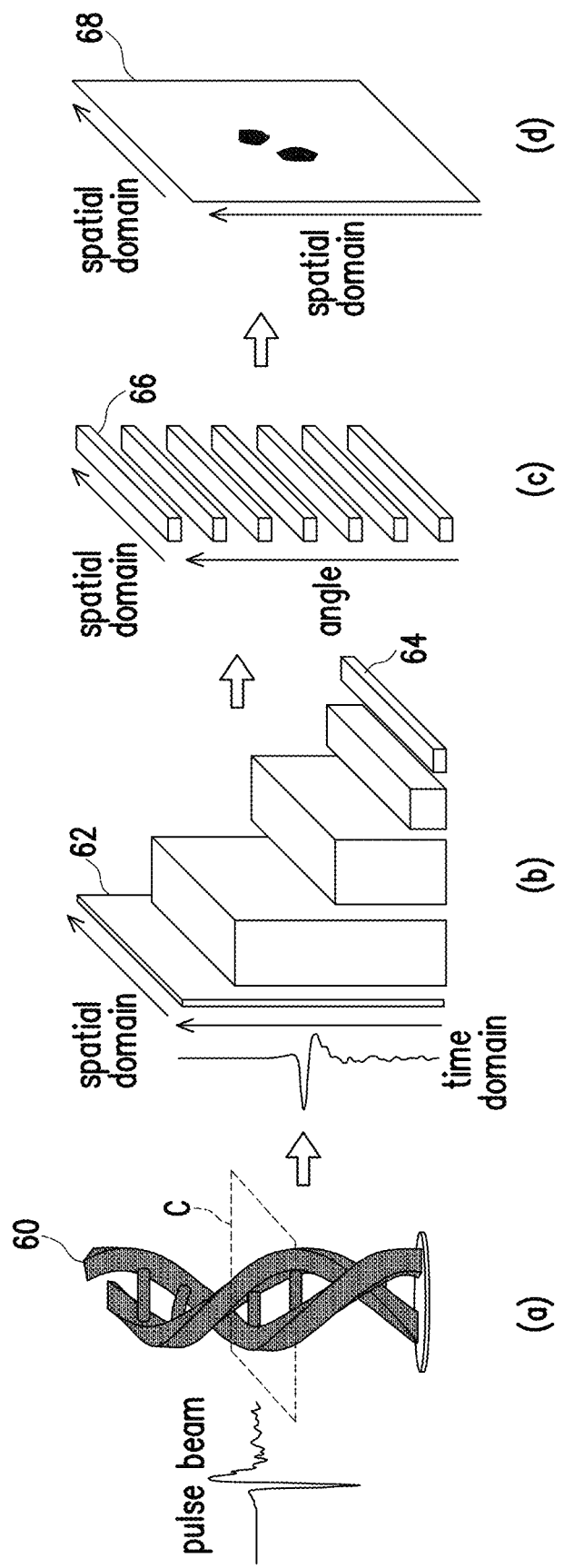
FIG. 6 is an example of a tomography method based on time-domain spectroscopy according to an embodiment of the disclosure.

For example, FIG. 6 is an example of a tomography method based on time-domain spectroscopy according to an embodiment of the disclosure. Please refer to FIG. 2 and FIG. 6 at the same time. The embodiment describes the detailed implementation of the tomography apparatus 20 performing the tomography method based on time-domain spectroscopy.

In Step (a), the processor 26 prints an object to be measured 60 according to the three-dimensional model of the object 50 shown in FIG. 5 using a three-dimensional printing apparatus, and scans a cross-section C of the object to be measured 60 of a preset angle (for example, 0 degrees) using a pulse beam.

In Step (b), the processor 26 performs the scanning and detecting steps described in the above embodiment, samples the time-domain pulse signal detected at each location of the scan path to obtain multiple sampling points (for example, 1000 sampling points), and stacks the sampling points at all locations (for example, 288 locations) of the scan path to form a feature array 62 (with size 288×1000). The vertical direction of the feature array represents the sampling points (time-domain) of the time-domain pulse signal at the same location of the scan path, and the horizontal direction represents different locations (spatial-domain) of the scan path. The processor 26 obtains a reduced feature array 64 by performing reduction operations on multiple computing layers of the feature array 62.

Figure 7:
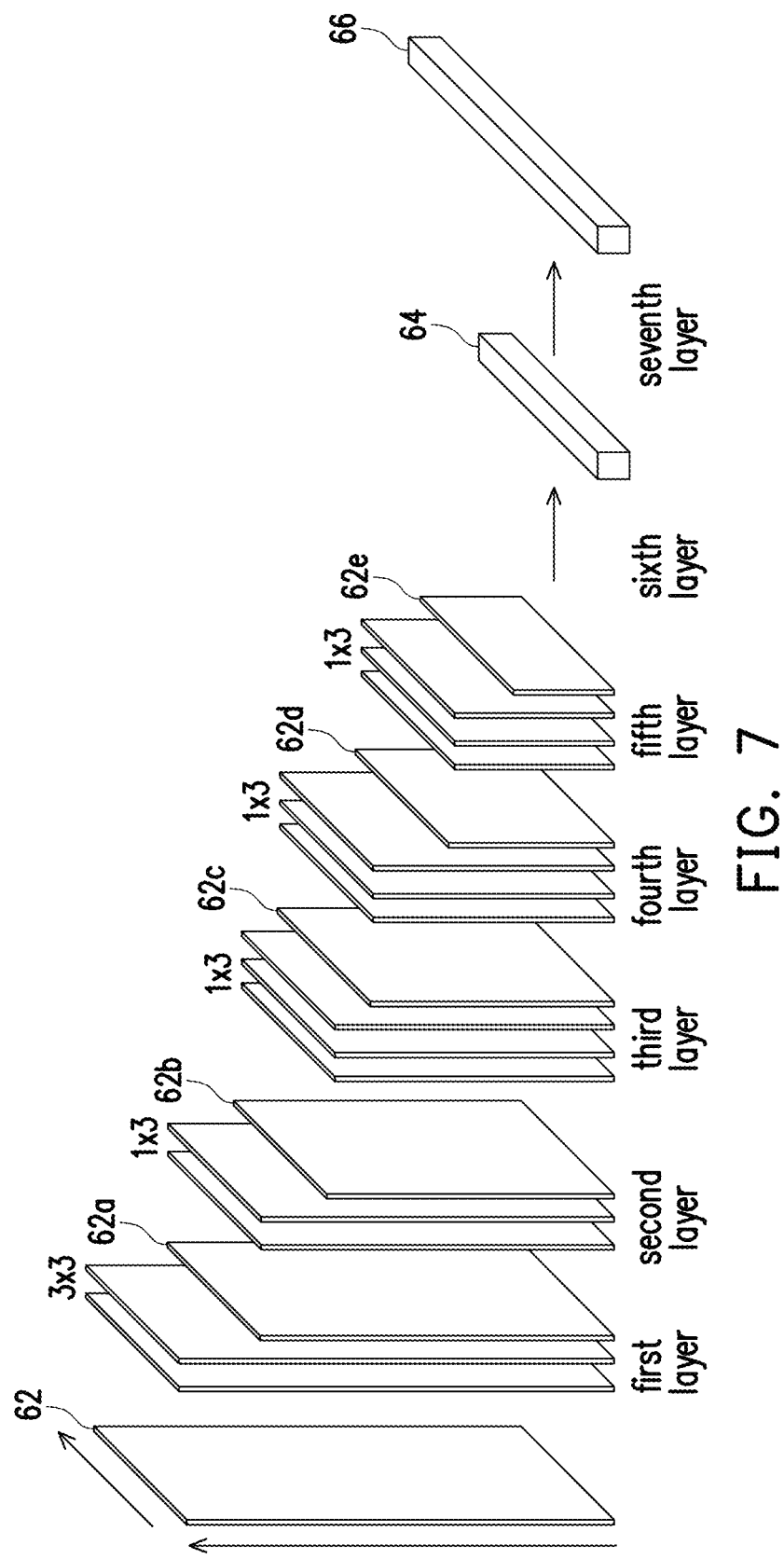
FIG. 7 is an example of a reduction operation of a feature array according to an embodiment of the disclosure.

In detail, FIG. 7 is an example of a reduction operation of a feature array according to an embodiment of the disclosure. Please refer to FIG. 7 at the same time. The embodiment is based on but not limited to a VGG-16 model with adjustable and insightful features, which uses kernels of sizes 3×3 and 1×3 to distinguish the reduction operation of feature array 62 into 7 layers, so as to calculate the reduced feature array 64, and to convert the reduced feature array 64 into the spatial-domain, so as to obtain a converted feature array 66. In other embodiments, other types of deep learning models may also be adopted to perform the reduction operation, which is not limited to the implementation of the embodiment.

In the first layer, two 3×3 kernels and the feature array 62 are used to perform two convolution operations, and 1×2 is used as the operation unit to perform the maximum pooling operation on the result of the convolution operations, so as to output a reduced feature array 62a with 32 channels.

In the second layer, a layer of 64 1×3 kernels with 32 channels and the reduced feature array 62a obtained in the first layer are sequentially used to perform one convolution operation. Then, a layer of 64 1×3 kernels with 64 channels and the calculation result of the above layer are used to perform one convolution operation, and 1×2 is used as the operation unit to perform the maximum pooling operation on the result of the convolution operation, so as to output a reduced feature array 62b with 64 channels.

In the third layer, a layer of 128 1×3 kernels with 64 channels and the reduced feature array 62b obtained in the second layer are sequentially used to perform three convolution operations. Then, two layers of 128 1×3 kernels with 128 channels and the calculation result of the previous layer are used to perform one convolution operation, and 1×2 is used as the operation unit to perform the maximum pooling operation on the result of the convolution operation, so as to output a reduced feature array 62c with 128 channels.

In the fourth layer, a layer of 256 1×3 kernels with 128 channels and the reduced feature array 62c obtained in the third layer are also sequentially used to perform one convolution operation. Then, two layers of 256 1×3 kernels with 256 channels and the calculation result of the previous layer are used to perform one convolution operation, and 1×2 is used as the operation unit to perform the maximum pooling operation on the result of the convolution operation, so as to output a reduced feature array 62d with 256 channels.

In the fifth layer, a layer of 256 1×3 kernels with 256 channels and the reduced feature array 62d obtained in the fourth layer are sequentially used to perform one convolution operation. Then, two layers of 256 1×3 kernels with 256 channels and the calculation result of the previous layer are used to perform one convolution operation, and 1×2 is used as the operation unit to perform the maximum pooling operation on the result of the convolution operation, so as to output a reduced feature array 62e with 256 channels. The kernels used in the third to fifth layers are the same, and the only difference is that the number of outputted channels (256) of the fourth and fifth layers is different from the number of outputted channels (128) of the third layer.

In the sixth layer, a global average or weighted average operation is performed on the reduced feature array 62e obtained in the fifth layer to obtain the one-dimensional feature array 64.

In the seventh layer, a two-dimensional convolution operation with 256 channels and 1×1 kernels is performed on the feature array 64 obtained in the sixth layer to convert the feature array 64 into the one-dimensional feature array 66 (with size 288×1) in the spatial-domain.

Returning to the example of FIG. 6, after the reduced feature array 64 of the current scan angle (that is, 0 degrees) is obtained and is converted into the one-dimensional feature array 66 in the spatial-domain, the scan angle may be sequentially changed (for example, by rotating 6 degrees each time) and Steps (a) and (b) are repeatedly performed to collect the one-dimensional feature array of multiple angles of the cross-section C.

In Step (c), the collected one-dimensional feature arrays of multiple angles are stacked into a two-dimensional feature array. For example, one-dimensional feature arrays of 0 degrees, 6 degrees, 12 degrees to 354 degrees are sequentially stacked from bottom to top to obtain the two-dimensional feature array (with size 288×60).

In Step (d), the features in each direction of the two-dimensional feature array are converted into the spatial-domain to reconstruct a cross-sectional image 68 of the cross-section C.

In summary, by reducing the feature array of each angle to the one-dimensional array, stacking the one-dimensional arrays into the two-dimensional array, and then performing the spatial-domain conversion, the operations of the processor 26 may be parallelized to increase the speed of image reconstruction.

It should be noted that, in the above embodiment, the tomography apparatus performs the reduction operations on the feature array by adopting 3×3 and 1×3 kernels with fixed sizes. However, in the case where the diameter of the pulse beam is greater than the sampling interval, the signal intensity at each sampling point may include pulse light scattered from other surrounding sampling points. Therefore, in other embodiments, the kernel size for performing operations on the feature array may be determined according to the beam size of the pulse beam and the sampling interval.

Figure 8A:
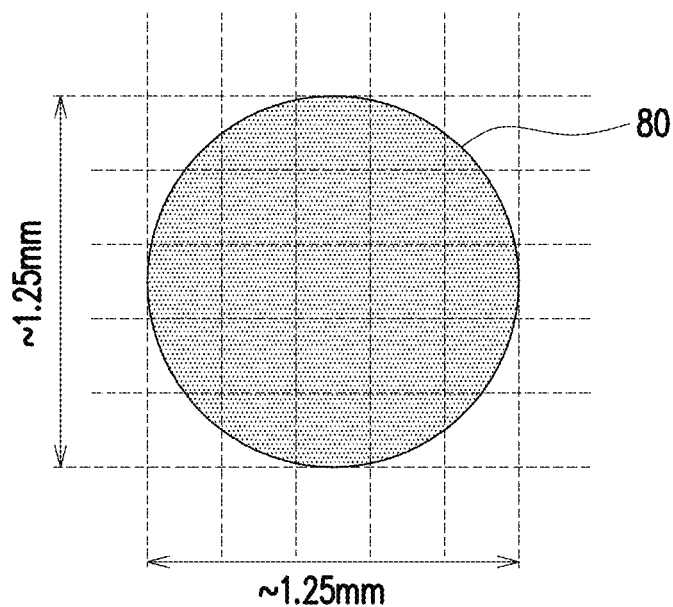
FIG. 8A and FIG. 8B is an example of determining a kernel size according to an embodiment of the disclosure.
Figure 8B:
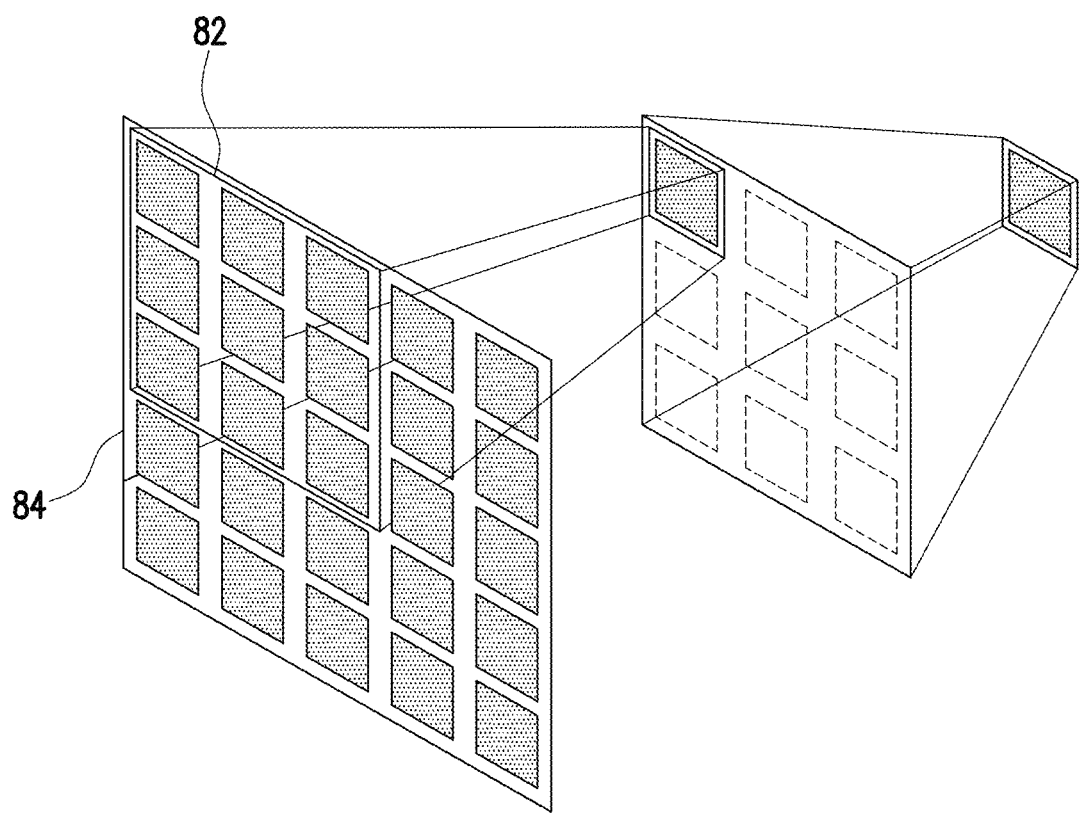

For example, FIG. 8A and FIG. 8B is an example of determining a kernel size according to an embodiment of the disclosure. Please refer to FIG. 8A. The embodiment adopts a pulse beam with a diameter of a facula 80 being 1.25 mm. However, the measurement interval based on the sampling point is 0.25 mm, which is one-fifth of the diameter of the facula 80, so kernels with a spatial-domain size of 5 may be adopted to perform the convolution operation, so that the information of 5 sampling points covered by the facula 80 may be taken into consideration when calculating the features. In some embodiments, the calculation method adopting kernels with a spatial-domain size of 5 may be changed to two operations adopting kernels with a spatial-domain size of 3, so as to achieve an effect similar to adopting kernels with a spatial-domain size of 5 while operational performance is improved. As shown in FIG. 8B, adopting kernels with a spatial-domain size of 3 to perform the convolution operation on a feature array 82 may reduce the information of 3 sampling points in the spatial-domain to 1 feature; and adopting kernels with a spatial-domain size of 3 to perform two convolution operations on the feature array 84 may reduce the information of 5 sampling points in the spatial-domain to 1 feature.

Figure 9:
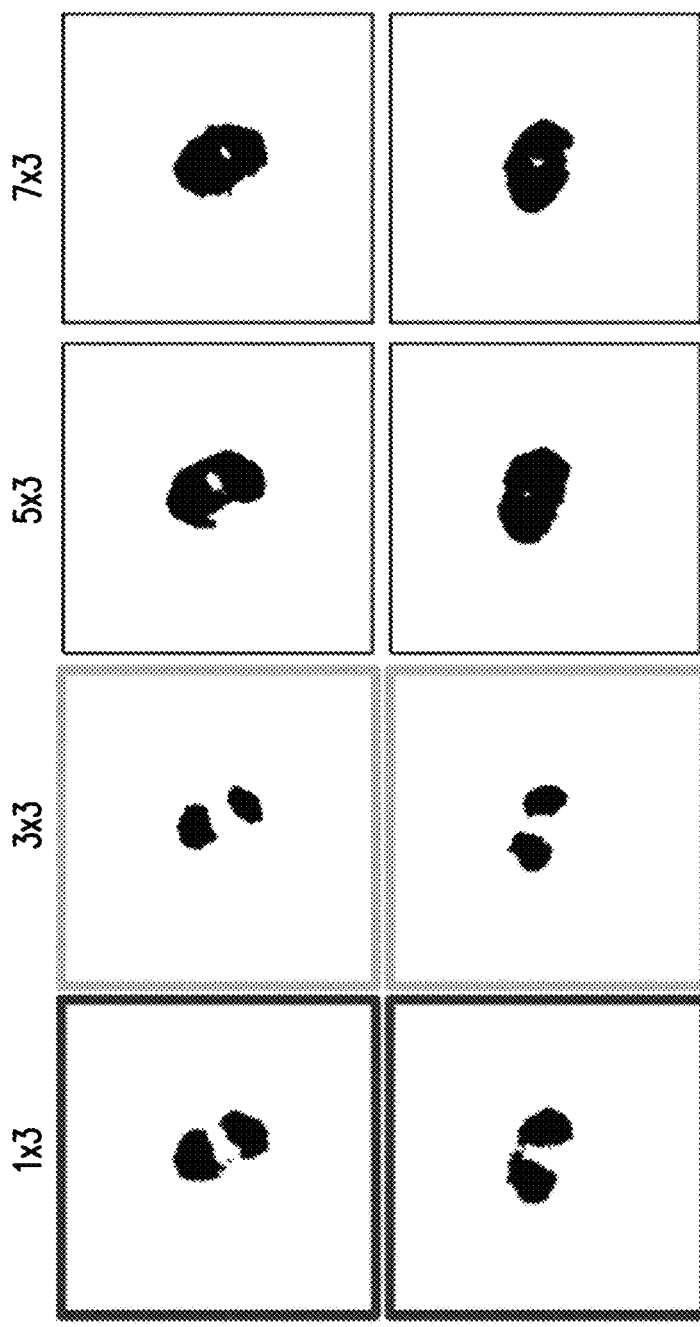
FIG. 9 is a comparative example of performing a feature reduction using different kernel sizes according to an embodiment of the disclosure.

FIG. 9 is a comparative example of performing a feature reduction using different kernel sizes according to an embodiment of the disclosure. Please refer to FIG. 9. In the embodiment, the image on the left is the ground truth image of the cross-section, and the images on the right are reconstructed images obtained by performing operations on the feature arrays of 30 angles sequentially using kernels with sizes 1×3, 3×3, 5×3, and 7×3. By comparing the reconstructed images with the ground truth image, the results show that using kernels with a size of 3×3, that is, kernels with a spatial-domain size of 3, will obtain better results. As such, it can be proved that the method of determining the kernel size according to the beam size of the pulse beam and the measurement interval of the sampling points in the embodiment of the disclosure can improve the resolution of the reconstructed image.

In the foregoing embodiments, the machine learning model is trained using the cross-sectional information obtained by scanning and detecting the objects to be measured of the same material. It has been experimentally proved that such machine learning model may also be configured to process cross-sectional information obtained by scanning and detection multiple objects to be measured of different materials, so as to reconstruct the cross-sectional images of the objects of different materials.

Figure 10A:
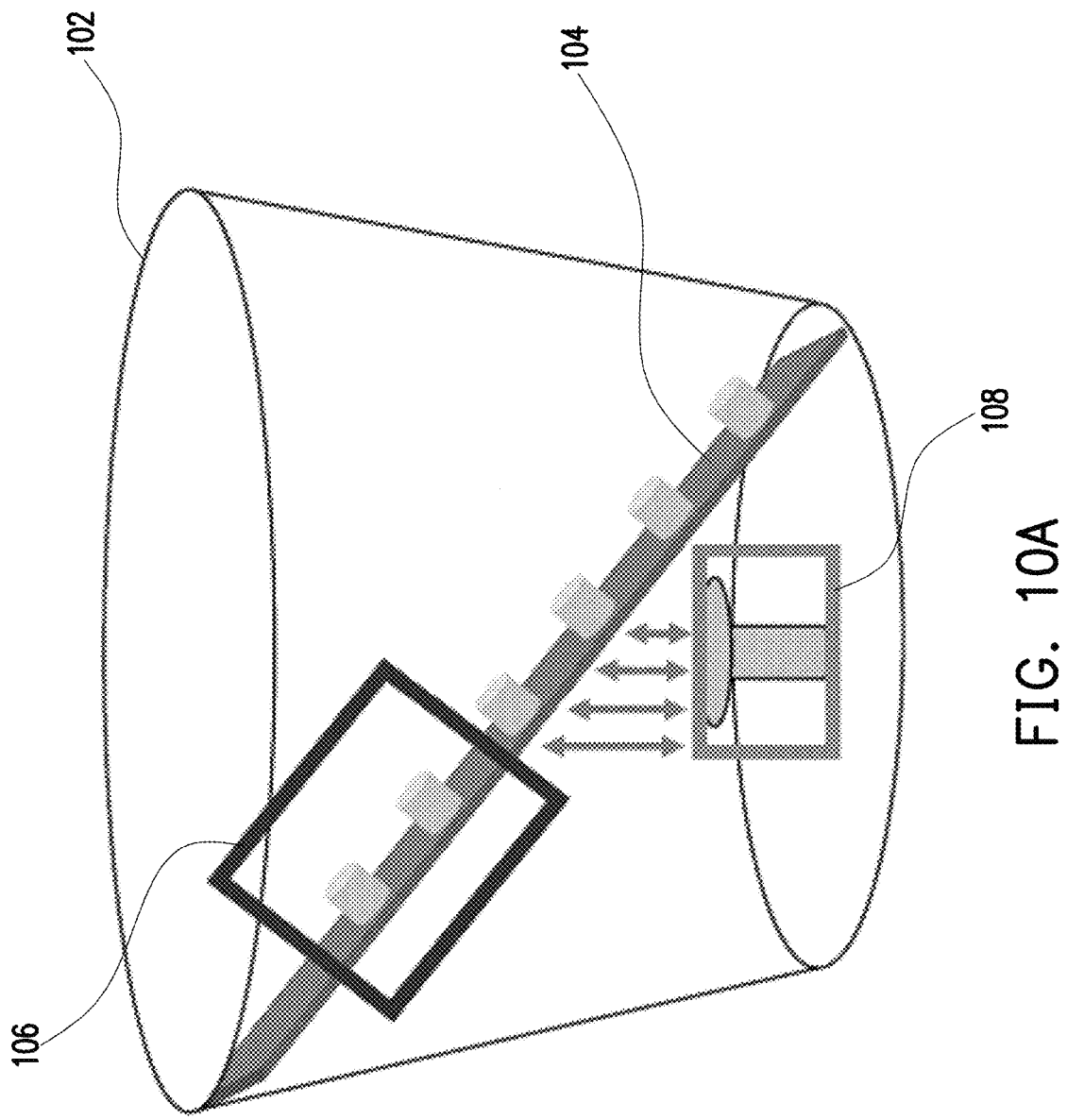
FIG. 10A and FIG. 10B is an example of reconstructing cross-sectional images of objects of different materials according to an embodiment of the disclosure.
Figure 10B:
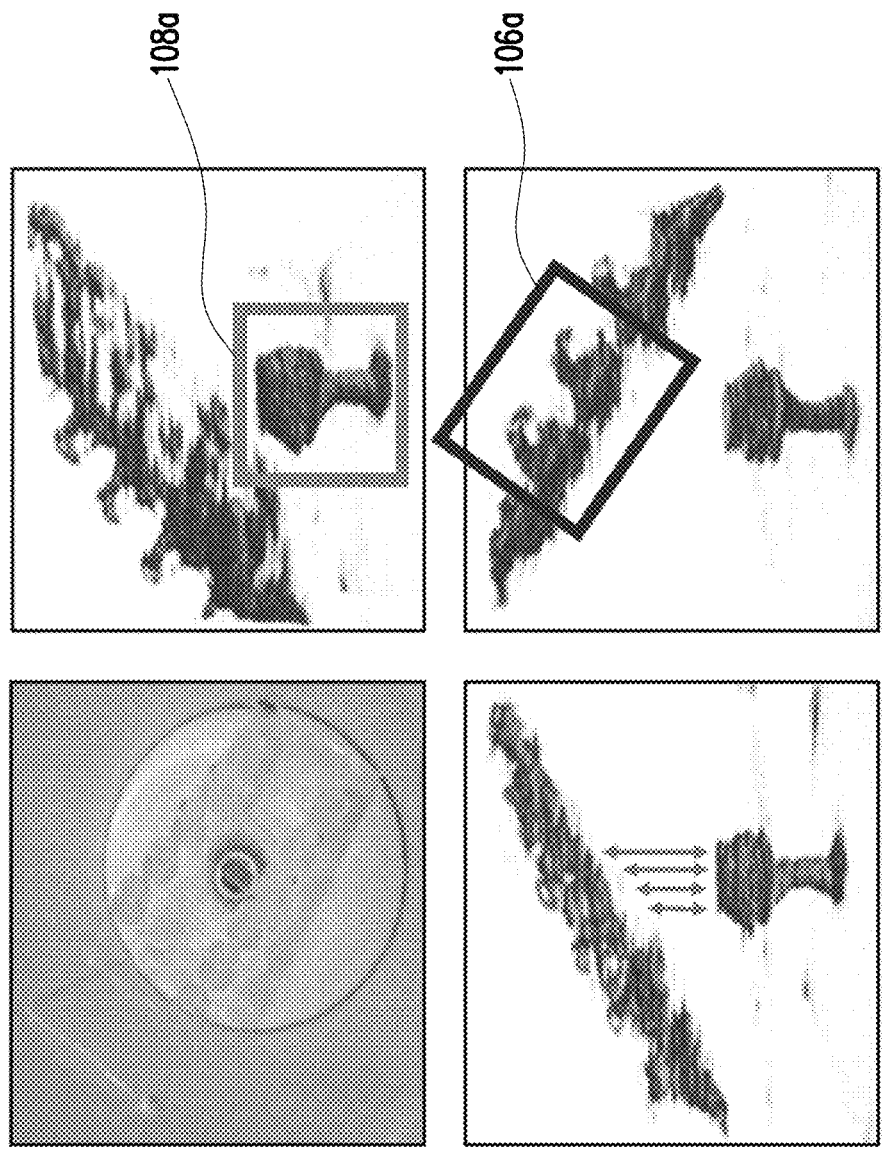

For example, FIG. 10A and FIG. 10B is an example of reconstructing cross-sectional images of objects of different materials according to an embodiment of the disclosure. Please refer to FIG. 10A. In the embodiment, a polymer platform 104 is obliquely disposed in a paper cup 102, a polymer (for example, plastic) 106 is disposed thereon, and a metal screw 108 is disposed at the bottom. It can be seen from a screw reconstructed image 106a and a polymer reconstructed image 108a in the reconstructed images of FIG. 10B that even if the scanned cross-section of the object includes objects of different materials, approximate contours and materials of the objects may still be reconstructed by the trained machine learning model.

It should be noted that in the foregoing embodiments, the machine learning model is trained using the cross-sectional information obtained by scanning and detecting the objects to be measured of the same material. However, in other embodiments, cross-sectional information obtained by scanning and detecting multiple objects to be measured of different materials may be adopted for training, so that the trained machine learning model may learn the features of objects of different materials, so as to reconstruct cross-sectional images of objects of different materials.

In summary, in the tomography method, system, and apparatus based on time-domain spectroscopy according to the embodiments of the disclosure, since the features retrieved by the tomography apparatus use complete time-domain pulse signals collected by scanning the object, data usage can be improved. In addition, since the features retrieved by the tomography apparatus are results processed and outputted by the machine learning model, and the machine learning model has been trained using a large amount of time information sets and ground truth images of cross-sections of objects, even in the absence of essential information of the object, the cross-sectional images of the object can still be reconstructed in a non-invasive way, and the spatial resolution of the image is increased.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tomography method based on time-domain spectroscopy, applicable to a tomography apparatus having a processor, the tomography method comprising:
controlling a light emitter to emit a pulse beam to scan a cross-section of an object to be measured while using a light receiver to detect the pulse beam passing through the object to be measured, so as to obtain time-domain pulse signals at a plurality of locations of a scan path, and repeatedly changing a scan angle to perform the scanning and detecting steps, so as to collect the time-domain pulse signals of a plurality of angles of the cross-section as a time information set of the cross-section;
retrieving a plurality of features from the time-domain pulse signal of each of the angles using a plurality of kernels of a trained machine learning model, wherein the machine learning model is trained with time information sets of a plurality of cross-sections and corresponding ground truth images to learn the kernels for retrieving the features; and
converting retrieved features into a spatial domain to reconstruct a cross-sectional image of the object to be measured.

2. The tomography method according to claim 1, wherein the step of retrieving the plurality of features from the time-domain pulse signal of each of the angles using the plurality of kernels comprises:
performing following operations for the time-domain pulse signal of each of the angles:
sampling the time-domain pulse signal detected at each of the locations of the scan path to obtain a plurality of sampling points, and stacking the sampling points at all locations of the scan path to form a feature array; and
distinguishing a plurality of computing layers to perform a reduction operation on the feature array, wherein the kernels are respectively used to perform at least one convolution operation and a max pooling operation on the feature array in each of the computing layers to reduce the feature array, and converting a reduced feature array into the spatial domain in a final layer of the computing layers; and
stacking a plurality of elements in a converted feature array of each of the angles as the retrieved features.

3. The tomography method according to claim 2, wherein the step of distinguishing the plurality of computing layers to perform the reduction operation on the feature array comprises:
performing a weighted average on the elements corresponding to each of the locations in the feature array as features at the location to reduce the feature array to a one-dimensional array.

4. The tomography method according to claim 2, further comprising:
  determining a size of each of the kernels according to a beam size of the pulse beam and a sampling interval of the sampling points.

5. The tomography method according to claim 1, further comprising:
  drawing a three-dimensional model according to a plurality of features of the object to be measured; and
  retrieving a cross-sectional image of the cross-section corresponding to each of the angles of the three-dimensional model as the corresponding ground truth images of the cross-sections for training the machine learning model.

6. The tomography method according to claim 5, wherein after the step of drawing the three-dimensional model according to the plurality of features of the object to be measured, the tomography method further comprises:
  printing the object to be measured according to the three-dimensional model using a three-dimensional printing apparatus and providing the printed object for the scanning and detecting steps, so as to obtain the time information sets of the cross-sections for training the machine learning model.

7. The tomography method according to claim 1, further comprising:
  performing the scanning and detecting steps on a plurality of objects to be measured of different materials to obtain the time information sets of the cross-sections of each of the objects to be measured for training the machine learning model.

8. A tomography system based on time-domain spectroscopy, comprising:
  a light emitter, for emitting a pulse beam;
  a light receiver, for detecting the pulse beam to obtain time-domain pulse signals; and
  a processing apparatus, coupled to the light emitter and the light receiver, and configured to perform a plurality of commands to:
  control the light emitter to emit the pulse beam to scan a cross-section of an object to be measured while using the light receiver to detect the pulse beam passing through the object to be measured, so as to obtain the time-domain pulse signals at a plurality of locations of a scan path, and repeatedly change a scan angle to perform the scanning and detecting steps, so as to collect the time-domain pulse signals of a plurality of angles of the cross-section as a time information set of the cross-section;
  retrieve a plurality of features from the time-domain pulse signal of each of the angles using a plurality of kernels of a trained machine learning model, wherein the machine learning model is trained with time information sets of a plurality of cross-sections and corresponding ground truth images to learn the kernels for retrieving the features; and
  convert retrieved features into a spatial domain to reconstruct a cross-sectional image of the object to be measured.

9. The tomography system according to claim 8, wherein the processing apparatus comprises:
  performing following operations for the time-domain pulse signal of each of the angles:
  sampling the time-domain pulse signal detected at each of the locations of the scan path to obtain a plurality of sampling points, and stacking the sampling points at all locations of the scan path to form a feature array; and
  distinguishing a plurality of computing layers to perform a reduction operation on the feature array, wherein the kernels are respectively used to perfonn at least one convolution operation and a max pooling operation on the feature array in each of the computing layers to reduce the feature array, and converting a reduced feature array into the spatial domain in a final layer of the computing layers; and
  stacking a plurality of elements in a converted feature array of each of the angles as the retrieved features.

10. The tomography system according to claim 9, wherein the processing apparatus comprises performing a weighted average on the elements corresponding to each of the locations in the feature array as features at the location to reduce the feature array to a one-dimensional array.

11. The tomography system according to claim 9, wherein the processing apparatus further determines a size of each of the kernels according to a beam size of the pulse beam and a sampling interval of the sampling points.

12. The tomography system according to claim 8, wherein the processing apparatus further draws a three-dimensional model according to a plurality of features of the object to be measured; and retrieves a cross-sectional image of the cross-section corresponding to each of the angles of the three-dimensional model as the corresponding ground truth images of the cross-sections for training the machine learning model.

13. The tomography system according to claim 12, wherein the processing apparatus further prints the object to be measured according to the three-dimensional model using a three-dimensional printing apparatus to perform the scanning and detecting steps, so as to obtain the time information sets of the cross-sections for training the machine learning model.

14. The tomography system according to claim 8, wherein the processing apparatus further performs the scanning and detecting steps on a plurality of objects to be measured of different materials to obtain the time information sets of the cross-sections of each of the objects to be measured for training the machine learning model.

15. A tomography apparatus based on time-domain spectroscopy, comprising:
  a connection interface configured to connect a light emitter and a light receiver;
  a memory configured to store a computer program and measured data; and
  a processor, coupled to the connection apparatus and the storage apparatus, and configured to load and perform the computer program to:
  control the light emitter to emit a pulse beam to scan a cross-section of an object to be measured while using the light receiver to detect the pulse beam passing through the object to be measured, so as to obtain time-domain pulse signals at a plurality of locations of a scan path, and repeatedly change a scan angle to perform the scanning and detecting steps, so as to collect the time-domain pulse signals of a plurality of angles of the cross-section as a time information set of the cross-section;
  retrieve a plurality of features from the time-domain pulse signal of each of the angles using a plurality of kernels of a trained machine learning model, wherein the machine learning model is trained with time information sets of a plurality of cross-sections and corresponding ground truth images to learn the kernels for retrieving the features; and convert retrieved features into a spatial domain to reconstruct a cross-sectional image of the object to be measured.

\* \* \* \* \*